United States Patent
Cho et al.

(10) Patent No.: US 7,727,675 B2
(45) Date of Patent: Jun. 1, 2010

(54) POLYMER ELECTROLYTE, METHOD OF PREPARING THE SAME, AND FUEL CELL USING THE POLYMER ELECTROLYTE

(75) Inventors: Myung-dong Cho, Yongin-si (KR); Tae-young Kim, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 24 days.

(21) Appl. No.: 11/852,587

(22) Filed: Sep. 10, 2007

(65) Prior Publication Data
US 2008/0145745 A1 Jun. 19, 2008

(30) Foreign Application Priority Data
Dec. 18, 2006 (KR) ...................... 10-2006-0129662

(51) Int. Cl.
*H01M 6/14* (2006.01)
*C08F 283/04* (2006.01)

(52) U.S. Cl. .................. 429/309; 429/315; 525/185; 525/454; 525/455; 252/62.2

(58) Field of Classification Search .................. 429/46, 429/343, 309, 315, 26; 528/44; 525/185, 525/454, 455; 252/62.2
See application file for complete search history.

(56) References Cited

U.S. PATENT DOCUMENTS

| | | | |
|---|---|---|---|
| 5,525,436 A | 6/1996 | Savinell et al. | |
| 7,232,876 B2 * | 6/2007 | Tamura et al. | 528/60 |
| 7,452,487 B2 * | 11/2008 | Kanzaki | 252/500 |
| 2005/0231894 A1 * | 10/2005 | Yoshida et al. | 361/502 |
| 2006/0269817 A1 * | 11/2006 | Cho et al. | 429/33 |

* cited by examiner

*Primary Examiner*—Milton I Cano
*Assistant Examiner*—Michael Leonard
(74) *Attorney, Agent, or Firm*—Stein McEwen, LLP

(57) ABSTRACT

A polymer electrolyte includes a heat-treated polymerization product of a polyurethane-based compound and a polyethylene(meth)acrylic acid, wherein the polyurethane-based compound is produced by polymerizing a diisocyanate-based compound, a phosphoric acid-based polyol, and a chain extender. The polymer electrolyte has a high ionic conductivity at high temperatures without causing deformation of an electrolyte membrane. The polymer electrolyte membrane can be inexpensively and simply manufactured, and the thickness of the membrane can be easily controlled. In addition, a large amount of phosphoric acid can be impregnated into the polymer electrolyte. A fuel cell that is operative at a temperature of 100° C. or higher under non-humidified conditions and has improved energy generating efficiency can be prepared by employing the polymer electrolyte membrane.

22 Claims, 1 Drawing Sheet

POLYMER ELECTROLYTE, METHOD OF PREPARING THE SAME, AND FUEL CELL USING THE POLYMER ELECTROLYTE

CROSS-REFERENCE TO RELATED APPLICATION

This application claims the benefit of Korean Application No. 2006-129662, filed Dec. 18, 2006, in the Korean Intellectual Property Office, the disclosure of which is incorporated herein by reference.

BACKGROUND OF THE INVENTION

1. Field of the Invention

Aspects of the present invention relates to a polymer electrolyte. More particularly, aspects of the present invention relate to a polymer electrolyte having excellent ionic conductivity at high temperatures and that does not cause deformation of an electrolyte membrane, a method of preparing the same, and a fuel cell using the polymer electrolyte.

2. Description of the Related Art

Conventionally, ionic conductors, which are materials in which ions, such as, for example, protons, move when a voltage is applied, are widely known. Ionic conductors are used in electrochemical devices such as batteries, electrochemical sensors, or the like.

Fuel cells contain an ionic conductor, and, in terms of energy generating efficiency, system efficiency, long-term durability of constituent members, require a proton conductor that stably exhibits excellent proton conductivity for a long time at an operating temperature of 100 to 300° C. under non-humidified conditions or low-humidified conditions, such as a relative humidity of 50% or less.

Solid polymer-type fuel cells that meet this requirement have been developed. However, a solid polymer-type fuel cell that includes a perfluorocarbonsulfonic membrane as an electrolyte membrane has a disadvantage of insufficient energy generating efficiency at an operating temperature in the range of 100 to 300° C. under a relative humidity of 50% or less.

Further, there are fuel cells that include an electrolyte membrane having a substance that triggers proton conductivity, fuel cells that use a silica diffusion membrane, fuel cells that use an inorganic-organic composite membrane, fuel cells that use a phosphoric acid-doped graft membrane, and fuel cells that use an ionic liquid composite membrane.

In addition, a solid polymer electrolyte membrane formed of polybenzimidazole doped with a strong acid, such as a phosphoric acid or the like, is disclosed in U.S. Pat. No. 5,525,436.

However, such solid polymer electrolyte membranes described above cannot stably exhibit energy generating efficiency for a long time at high temperatures. In particular, long term stability is insufficient at a high operation temperature of 100 to 300° C. under non-humidified conditions or in a relative humidity of 50% or less.

SUMMARY OF THE INVENTION

Aspects of the present invention provide a polymer electrolyte that is suitable as a high-temperature polymer electrolyte having excellent ionic conductivity without causing deformation of an electrolyte membrane at high temperatures, a method of preparing the same, and a fuel cell having improved energy generating efficiency by employing the polymer electrolyte.

According to an aspect of the present invention, there is provided a polymer electrolyte including a heat-treated polymerization product of a polyurethane-based compound and a polyethylene(meth)acrylic acid represented by Formula 1, wherein the polyurethane-based compound is a polymerization product of a diisocyanate-based compound, a phosphoric acid-based polyol, and a chain extender and wherein the polyethylene(meth)acrylic acid represented by Formula 1 is as follows:

Formula 1

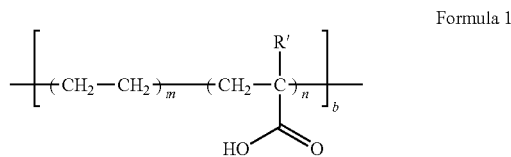

wherein R' is a hydrogen atom or a methyl group, m is 70 to 90 mole %, n is 10 to 30 mole %, and b is a number of 50 to 1000.

According to another aspect of the present invention, there is provided a method of preparing a polymer electrolyte, the method including: obtaining a polyurethane-based compound by polymerizing a mixture of a diisocyanate-based compound, a phosphoric acid-based polyol, a chain extender and a solvent; obtaining a corresponding salt of polyethylene acrylic acid represented by Formula 1 by adding a base to polyethylene acrylic acid represented by Formula 1; polymerizing a mixture prepared by adding the polyurethane-based compound and a solvent to the corresponding salt of polyethylene acrylic acid represented by Formula 1 to obtain a polymerization product; and heat-treating the polymerization product.

Formula 1

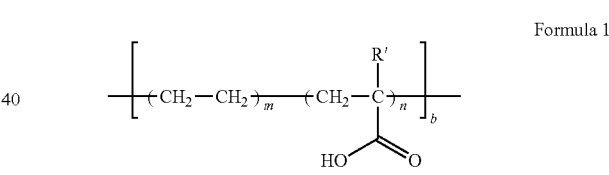

wherein R' is a hydrogen atom or a methyl group, m is 70 to 90 mole %, n is 10 to 30 mole %, and b is a number of 50 to 1000.

An additional polyol may be added to the mixture of the diisocyanate-based compound, the phosphoric acid-based polyol, the chain extender and the solvent in the obtaining of the polyurethane-based compound.

According to another aspect of the present invention, there is provided a fuel cell including a cathode, an anode and the polymer electrolyte as described above interposed between the cathode and the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
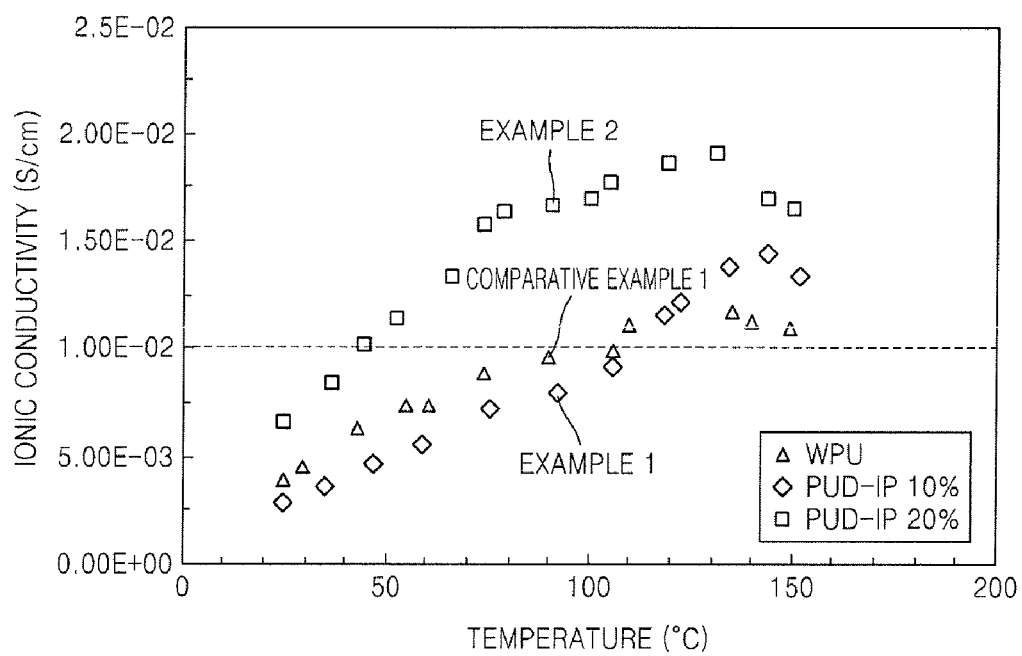
FIG. 1 is a graph of ionic conductivity with respect to temperature of the polymer electrolyte according to Examples 1 and 2 and Comparative Example 1 of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. Aspects of the invention may, however, be embodied in many different forms and should not be construed as being limited to the embodiments set forth herein; rather, these embodiments are provided so that this disclosure will be thorough and complete, and will fully convey the concept of the invention to those skilled in the art.

A polymer electrolyte according to the present invention is synthesized by polymerizing (cross-linking) a waterborne polyurethane-based compound and a poly(ethylene-co-(meth)acrylic acid) represented by Formula 1, and impregnating the polymerized product with an acid. Here, a crosslinking agent can further be added to the polymerization of the polyurethane-based compound and the poly(ethylene-co-(meth)acrylic acid).

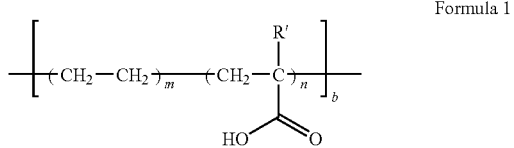

Formula 1 wherein R' is a hydrogen atom or a methyl group,
m is 70 to 90 mole %, n is 10 to 30 mole %, and
b is a number from 50 to 1000.

The polyurethane-based compound is synthesized by polymerizing a diisocyanate-based compound, a phosphoric acid-based polyol, and a chain extender, wherein the phosphoric acid-based polyol has an improved capability of retaining phosphoric acid, ionic conductivity, and compatibility with electrodes.

The phosphoric acid-based polyol may be a compound represented by Formula 2.

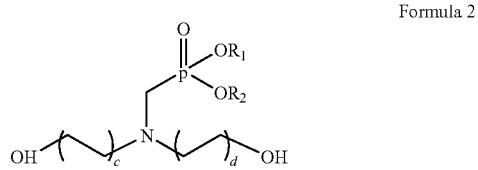

Formula 2 wherein $R_1$ and $R_2$ are each independently a C1-C20 alkyl group, and c and d are each independently an integer of 1 to 4.

An example of the phosphoric acid-based polyol is {bis-(2-hydroxyethyl)-amino]-methyl}-phosphonic acid diethyl ester represented by Formula 3.

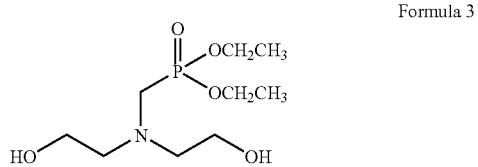

Formula 3

The amount of the phosphoric acid-based polyol may be in the range of 5 to 90 parts by weight based on 100 parts by weight of the diisocyanate-based compound.

An additional polyol (in addition to the phosphoric acid-based polyol) may be included in the polymerization of the diisocyanate-based compound, the phosphoric acid-based polyol, and the chain extender. In other words, the polyurethane-based compound may be synthesized by polymerizing the diisocyanate-based compound, the phosphoric acid-based polyol, an additional polyol and the chain extender. Non-limiting examples of the additional polyol include at least one of dimethylol butanoic acid, dimethylol propionic acid, poly(tetramethylene ether glycol (PTMEG), poly(propylene glycol) (PPG), and polycaprolactone diol (PCL).

When the phosphoric acid-based polyol and the additional polyol are simultaneously used, the amount of the phosphoric acid-based polyol may be in the range of 5 to 95 mole %, or, as a specific, non-limiting example, 10 to 90 mole % based on the total moles of the phosphoric acid-based polyol and the additional polyol. When the amount of the phosphoric acid-based polyol is within the range of 5 to 95 mole %, the polymer electrolyte has an excellent phosphoric acid retaining property and thermal stability.

Examples of a diisocyanate-based compound as a starting compound for synthesizing the polyurethane may include an aliphatic isocyanate-based compound such as hexamethylene diisocyanate (HMDI), and isophorone diisocyanate (IPDI) and/or an aromatic isocyanate-based compound such as toluene diisocyanate (TDI). As a specific, non-limiting example, the diisocyanate-based compound can be isophorone diisocyanate.

The chain extender may be a difunctional compound such as, for example, ethylene diamine, or the like.

The number average molecular weight of the waterborne polyurethane used herein may be 5,000 to 500,000. As a specific, non-limiting example, the number average molecular weight may be about 10,000. The number average molecular weight of the poly(ethylene-co-(meth)acrylic acid) represented by Formula 1 may be 10,000 to 500,000. As a specific, non-limiting example, the number average molecular weight of the poly(ethylene-co-(meth)acrylic acid) may be about 100,000.

An example of the poly(ethylene-co-(meth)acrylic acid) of Formula 1 used herein is poly(ethylene-co-acrylic acid) (PRIMACOR 5980, Dow Chemical), which may be represented by Formula 1 wherein R' is a hydrogen atom, m is 70 to 90 mole %, n is 10 to 30 mole %, and b is a number of 50 to 1000.

A crosslinking agent may be added to the polymerization of the waterborne polyurethane and the poly(ethylene-co-(meth)acrylic acid). The addition of the crosslinking agent may provide high mechanical strength and excellent stability at high temperatures.

The crosslinking agent may be an aziridine-based compound, an oxazoline-based compound, or a mixture thereof.

Examples of the aziridine-based compound include trimethylolpropane tri(2-methyl-1-aziridine propionate) and denaturalized diisocyanate and a diepoxide compound.

An example of the oxazoline-based compound is poly(dihydro-oxazoline) (EPOCROS, Nippon Shokubai Co.).

A method of preparing the polymer electrolyte according to the present invention will be described.

First, a polyurethane prepolymer is synthesized by reacting the diisocyanate and the phosphoric acid-based polyol. A polyol may further be added to the polyurethane prepolymer synthesis.

The polyurethane prepolymer synthesis may be performed at a temperature of 70 to 120° C. for 4 hours. As a specific, non-limiting example, the synthesis may be performed at about 90° C.

Then, a waterborne polyurethane is synthesized by polymerizing (for example, crosslinking) the polyurethane prepolymer and a chain extender.

The polymerization may be performed at a temperature of 150 to 250° C. and may be performed under an inert gas, such as a nitrogen or argon atmosphere.

The amount of the phosphoric acid-based polyol may be 5 to 90 parts by weight based on 100 parts by weight of the diisocyanate-based compound. The amount of the chain extender may be 5 to 60 parts by weight based on 100 parts by weight of the diisocyanate-based compound.

The solvent in the polymerization may be water ($H_2O$), or the like, and the amount of solid substances may be 20 to 40 parts by weight based on 100 parts by weight of the total weight of solid substances and water.

In the polyurethane synthesis, yields of the polyurethane can be maximized when the total amount of the polyol and the phosphoric acid-based polyol, the amount of the chain extender and the amount of the solvent are within the ranges described above.

In preparing the poly(ethylene-co-(meth)acrylic acid) represented by Formula 1, to be cross-linked with the polyurethane, the corresponding salt of the poly(ethylene-co-(meth)acrylic acid) may be formed by adding a base to the poly(ethylene-co-(meth)acrylic acid) and dissolving the resultant in water. Examples of the base may include ammonia water, triethylamine (TEA), tributylamine, sodium hydroxide (NaOH), potassium hydroxide (KOH) and lithium hydroxide (LiOH), but are not limited thereto. The amount of the base may be 30 to 100 parts by weight based on 100 parts by weight of the polyethylene(meth)acrylic acid. When the amount of the base is less than 30 parts by weight, the solubility of the poly(ethylene-co-(meth)acrylic acid) may be reduced.

The waterborne polyurethane-based compound and the solvent are added to the salt of the poly(ethylene-co-(meth)acrylic acid), and mixed.

The amount of the poly(ethylene-co-(meth)acrylic acid) may be 30 to 65 parts by weight based on 100 parts by weight of the polyurethane-based compound. When the amount of the poly(ethylene-co-(meth)acrylic acid) is less than 30 parts by weight, the polymer electrolyte has low mechanical strength and melts at high temperatures. On the other hand, when the amount of the poly(ethylene-co-(meth)acrylic acid) is greater than 65 parts by weight, only a small amount of the phosphoric acid is impregnated, and thus, the ionic conductivity of the polymer electrolyte may be reduced. The amount of the crosslinking agent may be 10 to 30 parts by weight based on 100 parts by weight of the polyurethane-based compound.

The solvent may be water (deionized water), and the amount of solid substances may be controlled to be 20 to 40 parts by weight based on 100 parts by weight of the total weight of the solid substances and water.

The mixture is cast and polymerized (crosslinked) at a temperature of 70 to 120° C. When the polymerization temperature is within the range, the reactivity of the polymerization can be optimized. The polymerization time may vary according to the polymerization temperature. For example, if the polymerization temperature is 120° C., the polymerization may be performed in 2 hours.

When the polymerization is completed, the products are heat-treated at a temperature of 150 to 300° C. to prepare a polymer electrolyte. Then, rearrangement reaction occurs in the polymerization products of the polyurethane-based compound and the poly(ethylene-co-(meth)acrylic acid) due to the heat-treatment.

Then, an acid may be added to the polymer electrolyte formed by the polymerization.

Examples of the acid include a phosphoric acid, a C1-C10 alkylphosphoric acid (e.g., methylphosphoric acid, ethylphosphoric acid, or trifluoroethylphosphonic acid), and a mixture thereof, but are not limited thereto. As a non-limiting example, when a mixture of the phosphoric acid and the C1-C10 alkylphosphoric acid is used, a mixture of 1-2 wt % C1-C10 alkylphosphoric acid and a 98-99 wt % phosphoric acid can be used.

As the amount of the phosphoric acid added to the polymer electrolyte increases, the ionic conductivity of the polymer electrolyte increases. However, according to an embodiment of the present invention, the amount of the phosphoric acid may be in the range of 150 to 500 parts by weight based on 100 parts by weight of the polyurethane compound.

The concentration of the phosphoric acid is not limited, but as non-limiting examples, may be a 80 to 100 wt %, or more specifically, may be a 85 wt % aqueous solution of phosphoric acid.

The acid may be impregnated at a high temperature of 80° C. for 1 to 4 hours. As a specific, non-limiting example, the acid may be impregnated for 2 hours.

The polymer electrolyte is formed of the heat-treated product of the polymerization products of the waterborne polyurethane-based compound and the poly(ethylene-co-(meth)acrylic acid) represented by Formula 1.

When a crosslinking agent is added to the polymerization, the polymer electrolyte is formed of the heat-treated product of the polymerization product of the waterborne polyurethane-based compound, the poly(ethylene-co-(meth)acrylic acid) represented by Formula 1, and the crosslinking agent.

The polymer electrolyte may have a thickness of 40 to 80 µm.

An electrolyte membrane according to aspects of the present invention has various physical and thermal characteristics according to degree of crosslinking between the waterborne polyurethane and the poly(ethylene-co-(meth)acrylic acid). The electrolyte membrane has a high mechanical strength derived from the poly(ethylene-co-(meth)acrylic acid), flexibility derived from the polyurethane, and excellent ionic conductivity.

A fuel cell according to an embodiment of the present invention uses the polymer electrolyte prepared according to aspects of the present invention as an electrolyte membrane. The electrolyte membrane is interposed between an oxygen electrode and a fuel electrode. An oxygen bipolar plate having an oxygen discharging path is disposed at an oxygen electrode, and a fuel bipolar plate having a fuel discharging path is disposed at a fuel electrode to prepare a unit cell for a solid polymer-type fuel cell.

As a result, a solid polymer-type fuel cell that stably exhibits energy generating efficiency for a long time at an operating temperature of 100 to 300° C. under non-humidified conditions or low-humidified conditions with a relative humidity of 50% or less can be obtained. The fuel cell is effective for car or home uses.

Aspects of the present invention will be described in more detail with reference to the following examples. The following examples are for illustrative purposes and are not intended to limit the scope of the invention.

Synthesis Example 1

Synthesis of Polyurethane (Using 10 Mole % of FYROL-6 (The bis-(2-hydroxyethyl)-amino]-methyl}-phosphonic acid diethyl ester Shown by Formula 3, Above) (Akzo Nobel Chemicals Inc.) as a Phosphoric Acid-Based Polyol, and 90 Mole % of Polytetramethylene Ether Glycol as a Polyol)

60 parts by weight of polytetramethylene ether glycol having a number average molecular weight of 1,000, 30 parts by weight of isophorone diisocyanate, 6 parts by weight of FYROL-6 (Akzo Nobel Chemicals Inc.) having a number average molecular weight of 255 as a phosphoric acid-based polyol, 4 parts by weight of ethylene diamine as a chain extender and 300 parts by weight of water as a solvent were mixed and reacted at 60° C. to synthesize a waterborne polyurethane.

Synthesis Example 2

Synthesis of Polyurethane (Using 20 Mole % of FYROL-6 as a Phosphoric Acid-Based Polyol, and 80 Mole % of Polytetramethylene Ether Glycol as a Polyol)

The waterborne polyurethane was synthesized in the same manner as in Synthesis Example 1, except that 48 parts by weight of polytetramethylene ether glycol having a number average molecular weight of 1,000, 30 parts by weight of isophorone diisocyanate, and 12 parts by weight of FYROL-6 (Akzo Nobel Chemicals Inc.) having a number average molecular weight of 255 as a phosphoric acid-based polyol were used.

Comparative Synthesis Example 1

Synthesis of Polyurethane

Polyurethane was synthesized in the same manner as in Synthesis Example 1, except that the phosphoric acid-based polyol was not used.

Example 1

Preparation of the Polymer Electrolyte Membrane 70 parts by weight of the waterborne polyurethane obtained according to Synthesis Example 1, 10 parts by weight of an aziridine-based compound and 20 parts by weight of EPOCROS (Nippon Shokubai Co.) were added to a mixture prepared by adding 100% ammonia water to 40 parts by weight of PEAA (Primacor 5980, Dow Chemical) and mixed, and deionized water as a solvent was added thereto and stirred.

The mixture was cast and polymerized at 120° C. for 4 hours, and the resultant was heat-treated at 250° C. for 24 hours to prepare a membrane having a thickness of about 40 µm.

The prepared membrane was impregnated with 85 wt % phosphoric acid at room temperature for 2 hours to prepare a polymer electrolyte.

Example 2

A polymer electrolyte was prepared in the same manner as in Example 1, except that the waterborne polyurethane obtained in Synthesis Example 2 was used instead of the waterborne polyurethane obtained in Syntheses Example 1.

Comparative Example 1

A polymer electrolyte was prepared in the same manner as in Example 1, except that the waterborne polyurethane obtained in Comparative Synthesis Example 1 was used instead of the waterborne polyurethane obtained in Synthesis Example 1.

Ionic conductivity of the polymer electrolytes prepared in Example 1, Example 2 and Comparative Example 1 were measured with respect to time, and the results are shown in FIG. 1.

Referring to FIG. 1, the polymer electrolytes prepared in Example 1 and 2 have a higher ionic conductivity at a temperature higher than 120° C. than that prepared in Comparative Example 1.

Example 4

A membrane-electrode assembly was prepared by interposing the polymer electrolyte membrane prepared in Example 1 between a cathode having a Pt—Co catalyst layer and an anode having a Pt catalyst layer, and a fuel cell was prepared using the membrane-electrode assembly. The fuel cell was operated using hydrogen and air at 110 to 150° C. under non-humidified conditions. The area of the electrode was 7.84 cm$^2$ (2.8 cm×2.8 cm), and the supplied amounts of hydrogen and air were respectively 100 ccm and 250 ccm.

Comparative Example 2

A fuel cell was prepared in the same manner as in Example 4, except that the electrolyte membrane prepared in Comparative Example 1 was used instead of the electrolyte membrane prepared in Example 1.

Figure 2:
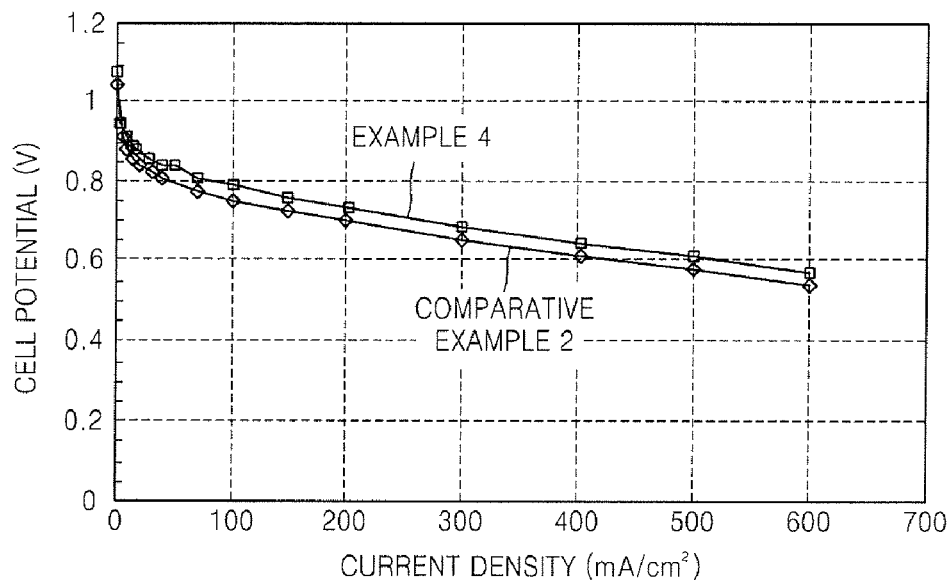
FIG. 2 is a graph of cell potential with respect to current density in the fuel cell according to Example 4 and Comparative Example 2.

Cell potentials with respect to current density in fuel cells prepared according to Example 4 and Comparative Example 2 were measured, and the results are shown in FIG. 2.

Referring to FIG. 2, the fuel cell of Example 4 has improved potential at the same current density compared to the fuel cell of Comparative Example 2.

The polymer electrolyte according to aspects of the present invention has a high ionic conductivity at high temperatures without causing deformation of an electrolyte membrane. The polymer electrolyte membrane can be inexpensively and simply manufactured compared to a conventional polybenzimidazole membrane or NAFION (DuPont) membrane, and the thickness of the membrane can be easily controlled. In addition, the polymer electrolyte has a large amount of the phosphoric acid impregnated therein and is useful as a high temperature polymer electrolyte due to an improved phosphoric acid retaining capability.

A fuel cell that is operative at a temperature of 100° C. or higher under non-humidified conditions and has improved energy generating efficiency can be prepared by employing the polymer electrolyte membrane.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymer electrolyte comprising a heat-treated polymerization product of a polyurethane-based compound and a poly(ethylene-co-(meth)acrylic acid) represented by Formula 1
wherein the polyurethane-based compound is a polymerization product of a diisocyanate-based compound, a phosphoric acid-based polyol, and a chain extender and wherein the poly(ethylene-co-(meth)acrylic acid) represented by Formula 1 is as follows:

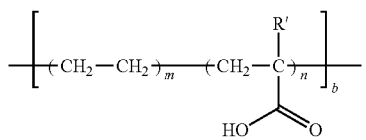

Formula 1 wherein
R' is a hydrogen atom or a methyl group,
m is 70 to 90 mole %,
n is 10 to 30 mole %, and
b is a number from 50 to 1000, and
wherein the polymer electrolyte is a polymer electrolyte of a fuel cell.

2. The polymer electrolyte of claim 1, wherein the phosphoric acid-based polyol is represented by Formula 2:

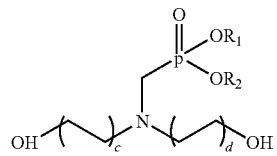

Formula 2 wherein $R_1$ and $R_2$ are each independently a C1-C20 alkyl group, and
c and d are each independently an integer of 1 to 4.

3. The polymer electrolyte of claim 2, wherein the phosphoric acid-based polyol is represented by Formula 3.

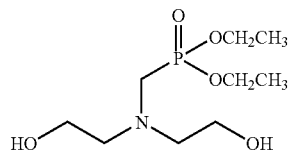

Formula 3

4. The polymer electrolyte of claim 1, wherein the amount of the phosphoric acid-based polyol is 5 to 90 parts by weight based on 100 parts by weight of the diisocyanate-based compound.

5. The polymer electrolyte of claim 1, wherein the polyurethane-based compound is a polymerization product of the diisocyanate-based compound, the phosphoric acid-based polyol, the chain extender and an additional polyol.

6. The polymer electrolyte of claim 5, wherein the amount of the phosphoric acid-based polyol is 5 to 95 mole % based on the total mole of the phosphoric acid-based polyol and the additional polyol.

7. The polymer electrolyte of claim 5, wherein the additional polyol is at least one compound selected from the group consisting of dimethylol butanoic acid, dimethylol propionic acid, poly(tetramethylene ether glycol), poly(propylene glycol), and polycaprolactone.

8. The polymer electrolyte of claim 1, wherein the diisocyanate-based compound is at least one compound selected from the group consisting of isophorone diisocyanate, hexamethylene diisocyanate and toluene diisocyanate.

9. The polymer electrolyte of claim 1, wherein the chain extender is ethylenediamine, and the amount of the chain extender is 5 to 60 parts by weight based on 100 parts by weight of the diisocyanate-based compound.

10. The polymer electrolyte of claim 1, wherein the amount of the poly(ethylene-co-(meth)acrylic acid) is 30 to 65 parts by weight based on 100 parts by weight of the polyurethane-based compound.

11. The polymer electrolyte of claim 1, wherein the polymerization product of the polyurethane-based compound and the poly(ethylene-co-(meth)acrylic acid) is produced by polymerizing the polyurethane-based compound, the poly(ethylene-co-(meth)acrylic acid) and a crosslinking agent.

12. The polymer electrolyte of claim 11, wherein the crosslinking agent is an aziridine-based compound, an oxazoline-based compound, or a mixture thereof, and the amount of the crosslinking agent is 5 to 30 parts by weight based on 100 parts by weight of the polyurethane-based compound.

13. The polymer electrolyte of claim 1, further comprising an acid.

14. The polymer electrolyte of claim 13, wherein the acid is a phosphoric acid, a C1-C10 alkylphosphoric acid or a mixture thereof, and the amount of the acid is in the range of 150 to 500 parts by weight based on 100 parts by weight of the polyurethane compound.

15. A method of preparing the polymer electrolyte of claim 1, the method comprising:
obtaining the polyurethane-based compound by polymerizing a mixture of the diisocyanate-based compound, the phosphoric acid-based polyol, the chain extender and a solvent;
obtaining a corresponding salt of the polyethylene acrylic acid represented by Formula 1:

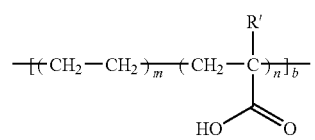

Formula 1 wherein, R' is a hydrogen atom or a methyl group,
m is 70 to 90 mole %,
n is 10 to 30 mole %, and
b is a number of 50 to 1000,
by adding a base to the polyethylene acrylic acid represented by Formula 1;
polymerizing a mixture prepared by adding the polyurethane-based compound and a solvent to the corresponding salt of the polyethylene acrylic acid represented by Formula 1 to obtain a polymerization product; and
heat-treating the polymerization product.

16. The method of claim 15, wherein an additional polyol is added to the mixture of the diisocyanate-based compound, the phosphoric acid-based polyol, the chain extender and the solvent in the obtaining of the polyurethane-based compound.

17. The method of claim 15, further comprising impregnating the heat-treated polymerization product with an acid.

18. The method of claim 17, wherein the acid is a phosphoric acid, a C1-C10 alkylphosphoric acid or a mixture thereof.

19. The method of claim 15, wherein the polymerizing of the mixture prepared by adding the polyurethane-based compound and a solvent to the corresponding salt of the polyethylene acrylic acid represented by Formula 1 comprises casting the mixture prepared by adding the polyurethane-based compound and a solvent to the corresponding salt of the polyethylene acrylic acid represented by Formula 1 and heat-treating the cast mixture at a temperature in the range of 80 to 120° C.

20. The method of claim 15, wherein the heat-treating of the polymerization product is performed at a temperature in the range of 150 to 300° C.

21. The method of claim 15, wherein the base is at least one compound selected from the group consisting of ammonia water, triethylamine (TEA), tributylamine, sodium hydroxide (NaOH), potassium hydroxide (KOH) and lithium hydroxide (LiOH).

22. A fuel cell comprising a cathode, an anode and the polymer electrolyte of claim 1 interposed between the cathode and the anode.

* * * * *